US012163368B2

(12) United States Patent
Tamura

(10) Patent No.: US 12,163,368 B2
(45) Date of Patent: Dec. 10, 2024

(54) VEHICLE OPERATION DETECTION DEVICE AND VEHICLE OPERATION DETECTION METHOD

(71) Applicant: AISIN CORPORATION, Kariya (JP)

(72) Inventor: Takuya Tamura, Kariya (JP)

(73) Assignee: AISIN CORPORATION, Kariya (JP)

( * ) Notice: Subject to any disclaimer, the term of this patent is extended or adjusted under 35 U.S.C. 154(b) by 377 days.

(21) Appl. No.: 17/804,872

(22) Filed: Jun. 1, 2022

(65) Prior Publication Data

US 2022/0412149 A1 Dec. 29, 2022

(30) Foreign Application Priority Data

Jun. 25, 2021 (JP) ................. 2021-105507

(51) Int. Cl.
*B60R 25/01* (2013.01)
*B60R 25/20* (2013.01)
*B60R 25/30* (2013.01)
*E05F 15/73* (2015.01)

(52) U.S. Cl.
CPC ............ *E05F 15/73* (2015.01); *B60R 25/01* (2013.01); *B60R 25/2054* (2013.01); *B60R 25/305* (2013.01); *B60R 25/2045* (2013.01); *E05F 2015/767* (2015.01); *E05Y 2400/858* (2013.01); *E05Y 2900/531* (2013.01)

(58) Field of Classification Search
CPC .... E05F 15/73; E05F 2015/767; B60R 25/01; B60R 25/2054; B60R 25/305; B60R 25/2045; E05Y 2400/858; E05Y 2900/531; E05Y 2400/456; E05Y 2400/852; E05Y 2900/546; G06F 3/0304; G06F 3/017; G06N 3/0464; G06N 20/00; G06V 10/82; G06V 20/56; G06V 40/20; G06V 40/10
See application file for complete search history.

(56) References Cited

U.S. PATENT DOCUMENTS 11,144,754 B2 * 10/2021 Hu ..................... G06V 40/193
2010/0325590 A1 * 12/2010 Homma ............... G06V 40/20
715/863
2016/0281410 A1 9/2016 Schanz et al.

FOREIGN PATENT DOCUMENTS

JP 2016-196798 A 11/2016

* cited by examiner

*Primary Examiner* — Juan M Guillermety
(74) *Attorney, Agent, or Firm* — Oblon, McClelland, Maier & Neustadt, L.L.P.

(57) ABSTRACT

A vehicle operation detection device includes a storage unit configured to store a trained model obtained by machine learning using training data in which an image captured in advance and a body part used for a gesture of a user are associated with each other, an entry determination unit configured to determine whether, based on a position of the body part in the image obtained by inputting a newly captured image into the trained model, the body part enters a recognition area set in an imaging area of a camera, and a gesture determination unit configured to calculate a displacement vector of the body part based on images captured at a time interval after it is determined that the body part enters the recognition area, and determine, in accordance with whether a direction of the displacement vector is a direction corresponding to the gesture, whether the gesture is made.

7 Claims, 8 Drawing Sheets

VEHICLE OPERATION DETECTION DEVICE AND VEHICLE OPERATION DETECTION METHOD

CROSS REFERENCE TO RELATED APPLICATIONS

This application is based on and claims priority under 35 U.S.C. § 119 to Japanese Patent Application 2021-105507, filed on Jun. 25, 2021, the entire content of which is incorporated herein by reference.

TECHNICAL FIELD

This disclosure relates to a vehicle operation detection device and a vehicle operation detection method.

BACKGROUND DISCUSSION

JP 2016-196798A (Reference 1) discloses a vehicle including a vehicle body provided with an opening portion, a vehicle gate that opens and closes the opening portion, a gate actuator that drives the vehicle gate, a camera that captures an image of a periphery of the vehicle, and a vehicle operation detection device that controls the gate actuator. The vehicle operation detection device causes the gate actuator to open the vehicle gate when determining, based on the image captured by the camera, that a user makes a predetermined gesture.

The vehicle operation detection device as described above has room for improvement in regard to accurately detecting a gesture of the user.

SUMMARY

According to an aspect of this disclosure, a vehicle operation detection device, which is to be applied to a vehicle including a vehicle body having an opening portion, an opening and closing body configured to open and close the opening portion, a driving unit configured to cause an opening or closing operation of the opening and closing body, and a camera configured to capture an image of a periphery of the opening portion, and which detects a gesture of a user as a trigger to start the opening or closing operation of the opening and closing body, includes: a storage unit configured to store a trained model obtained by machine learning using training data in which the image captured in advance and a body part used for the gesture of the user are associated with each other; an entry determination unit configured to determine, based on a position of the body part in the image obtained by inputting a newly captured image into the trained model, whether the body part enters a recognition area set in an imaging area of the camera; and a gesture determination unit configured to calculate a displacement vector of the body part based on a plurality of images captured at a time interval after it is determined that the body part enters the recognition area, and determine, in accordance with whether a direction of the displacement vector is a direction corresponding to the gesture, whether the gesture is made.

According to another aspect of this disclosure, a vehicle operation detection method for solving the above problem, which is to be applied to a vehicle including a vehicle body having an opening portion, an opening and closing body configured to open and close the opening portion, a driving unit configured to cause an opening or closing operation of the opening and closing body, and a camera configured to capture an image of a periphery of the opening portion, and which is for detecting a gesture of a user as a trigger to start the opening or closing operation of the opening and closing body, includes: a step of acquiring a position of a body part in the image by inputting a newly captured image into a trained model obtained by machine learning using training data in which the image captured in advance and the body part used for the gesture of the user are associated with each other; a step of determining, based on the acquired position of the body part, whether the body part enters a recognition area set in an imaging area of the camera; a step of calculating a displacement vector of the body part based on a plurality of images captured at a time interval after it is determined that the body part enters the recognition area; and a step of determining, in accordance with whether a direction of the displacement vector is a direction corresponding to the gesture, whether the gesture is made.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

Figure 1:
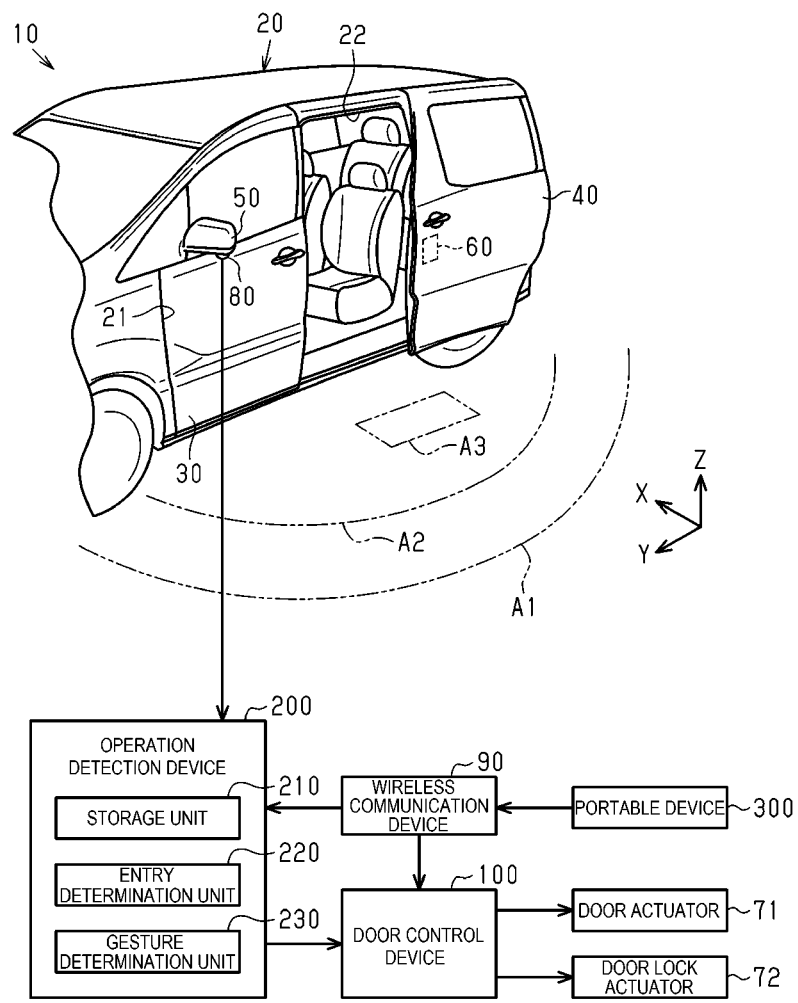
FIG. 1 is a schematic diagram of a vehicle including an operation detection device according to an embodiment.

Hereinafter, an embodiment of a vehicle operation detection device (hereinafter, also referred to as an "operation detection device") and a vehicle operation detection method (hereinafter, also referred to as an "operation detection method") will be described with reference to the drawings. In the following description, a width direction of a vehicle is also referred to as a "width direction", a front-rear direction of the vehicle is also referred to as a "front-rear direction", and an up-down direction of the vehicle is also referred to as an "up-down direction". In the drawings, an axis extending in the width direction is indicated by an X axis, an axis extending in the front-rear direction is indicated by a Y axis, and an axis extending in the up-down direction is indicated by a Z axis.

As shown in FIG. 1, a vehicle 10 includes a vehicle body 20, a front door 30, a sliding door 40, a side mirror 50, and a lock mechanism 60. In addition, the vehicle 10 includes a door actuator 71, a door lock actuator 72, a camera 80, a wireless communication device 90, a door control device 100, and an operation detection device 200.

The vehicle body 20 includes a door opening portion 21 to be opened and closed by the front door 30 and a door opening portion 22 to be opened and closed by the sliding door 40. The door opening portions 21 and 22 are portions through which a user passes when moving between an inside and an outside of the vehicle 10. The door opening portion 22 corresponds to an example of an "opening portion".

The front door 30 is displaced between a fully closed position at which the door opening portion 21 is fully closed and a fully open position at which the door opening portion 21 is fully opened by swinging about an axis extending in the up-down direction with respect to the vehicle body 20. The side mirror 50 is attached to a portion near a front end of the front door 30.

The sliding door 40 is displaced between a fully closed position at which the door opening portion 22 is fully closed and a fully open position at which the door opening portion 22 is fully opened by sliding in the front-rear direction with respect to the vehicle body 20. An opening direction of the sliding door 40 is a rearward direction, and a closing direction of the sliding door 40 is a forward direction. The sliding door 40 is opened and closed between the fully closed position and the fully open position by the door actuator 71. The sliding door 40 corresponds to an example of an "opening and closing body", and the door actuator 71 corresponds to an example of a "driving unit".

The lock mechanism 60 switches between a fully latched state in which the sliding door 40 disposed at the fully closed position is restrained by the vehicle body 20 and an unlatched state in which the sliding door 40 at the fully closed position is released from the restraint of the vehicle body 20. The lock mechanism 60 shifts from the fully latched state to the unlatched state or from the unlatched state to the fully latched state by the door lock actuator 72. In the following description, a shift of the lock mechanism 60 from the fully latched state to the unlatched state is also referred to as an "unlatching operation", and a shift of the lock mechanism 60 from the unlatched state to the fully latched state is also referred to as a "fully latching operation". The door lock actuator 72 corresponds to an example of the "driving unit".

The camera 80 is installed on the side mirror 50 so as to face downward and rearward. In FIG. 1, although only the camera 80 installed on the side mirror 50 on a left side is shown, the camera 80 is also installed on the side mirror 50 on a right side. As shown in FIG. 1, an imaging area A2 of the camera 80 includes an area of a periphery of the door opening portion 22. An angle of view of the camera 80 is preferably a wide angle. The camera 80 outputs a captured image to the operation detection device 200 for each frame.

A portable device 300 includes a switch that is operated during an opening or closing operation or a stop of the sliding door 40. The portable device 300 may be a so-called electronic key, a smartphone, or another communication terminal. The wireless communication device 90 determines whether the portable device 300 is associated with the vehicle 10 by performing wireless communication with the portable device 300 located around the vehicle 10. In this regard, the wireless communication device 90 can determine whether the user carrying the portable device 300 is present in a communication area A1 set around the vehicle 10. The communication area A1 is an area slightly larger than the imaging area A2.

In the portable device 300, when the switch is operated to operate the sliding door 40, the wireless communication device 90 outputs an opening operation command signal, a closing operation command signal, and a stop command signal to the door control device 100 in accordance with the operated switch. The opening operation command signal is a command signal for opening the sliding door 40, and the closing operation command signal is a command signal for closing the sliding door 40. The stop command signal is a command signal for stopping the sliding door 40 during the opening or closing operation. When the portable device 300 is present in the communication area A1, the wireless communication device 90 outputs a signal indicating that the portable device 300 is present in the communication area A1 to the operation detection device 200.

The door control device 100 controls the door actuator 71 and the door lock actuator 72 based on contents of the received command signal. Specifically, when the opening operation command signal is received, the door control device 100 causes the lock mechanism 60 to perform the unlatching operation, and then causes the sliding door 40 to open. When the closing operation command signal is received, the door control device 100 causes the sliding door 40 to be closed near the fully closed position, and then causes the lock mechanism 60 to perform the fully latching operation. When the stop command signal is received, the door control device 100 stops the sliding door 40 in operation.

Next, the operation detection device 200 will be described.

When detecting a gesture using a tiptoe T of a foot F of the user (hereinafter, also referred to as a "tiptoe T of the user"), the operation detection device 200 outputs a command signal corresponding to the gesture to the door control device 100. That is, the gesture of the user is a trigger for the opening or closing operation of the sliding door 40, and the operation detection device 200 detects a request for operating the sliding door 40 from the user. In the present embodiment, the tiptoe T of the user corresponds to an example of a "body part" used for a gesture of the user.

As shown in FIG. 1, the operation detection device 200 includes a storage unit 210, an entry determination unit 220, and a gesture determination unit 230.

The storage unit 210 stores a trained model obtained by machine learning using training data in which an image captured in advance and the tiptoe T of the user are associated with each other. That is, the trained model is a model that receives the image captured by the camera 80 as input and outputs a tiptoe position of the user in the image. For example, the trained model is created during designing of the vehicle 10, and is written in the storage unit 210 during manufacturing of the vehicle 10.

Figure 2:
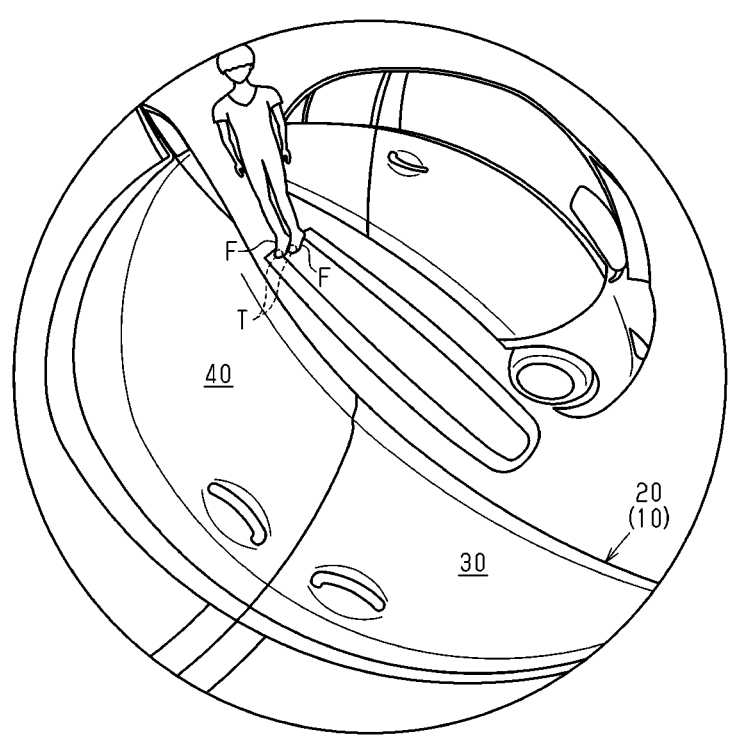
FIG. 2 is a diagram showing an example of training data, which is an image captured by a camera.

Hereinafter, a method of generating the trained model will be described. The method of generating the trained model includes a preparation step of preparing training data as shown in FIG. 2, and a learning step of performing machine learning based on the training data.

The preparation step includes an acquisition step of acquiring images captured in a state in which the user stands in the imaging area A2 under various conditions, and a designation step of designating the tiptoe position of the user in a plurality of images acquired in the acquisition step.

The acquisition step is performed using, for example, a test vehicle associated with the actual vehicle 10. In the acquisition step, it is preferable to acquire many images captured by changing a condition related to the user and a condition related to an environment around the vehicle 10.

In the acquisition step, it is preferable to acquire an image when a direction of the user with respect to the vehicle 10 is different, an image when a physique of the user is different, an image when footwear and clothes of the user are different, an image when personal belongings of the user are different, an image when a direction in which a shadow of the user is formed is different, and the like. In addition, in the acquisition step, it is preferable to acquire an image when brightness around the vehicle 10 is different, such as daytime and nighttime, an image when weather is different, such as fine weather and rainy weather, an image when a type of the ground on which the vehicle 10 stops is different, such as presence or absence of paving, and the like. Accordingly, it is possible to obtain a trained model that can be applied to various situations, in other words, a trained model having high versatility.

In the designation step, as indicated by dashed arrows in FIG. 2, the position of the tiptoe T of the user is designated in the acquired image. For designation of the position, for example, coordinates using pixels in the image may be used. As a result, training data as shown in FIG. 2 is generated.

In the learning step, a model is generated by machine learning using a plurality of pieces of training data as learning data. As a method of machine learning, various methods can be selected, for example, a convolutional neural network (CNN). The trained model outputs the tiptoe position of the user by receiving the captured image.

Next, the entry determination unit 220 will be described. The entry determination unit 220 performs entry determination processing and direction specification processing.

<Entry Determination Processing>

In the entry determination processing, the entry determination unit 220 determines whether the user enters a recognition area A3 set in the imaging area A2 of the camera 80. Specifically, the entry determination unit 220 acquires the tiptoe position of the user in the image by inputting images captured at a time interval into the trained model. Subsequently, the entry determination unit 220 determines whether the acquired tiptoe position is present in the recognition area A3. Since the trained model outputs tiptoe positions of both feet, the entry determination unit 220 determines whether the tiptoe positions of both feet are present in the recognition area A3.

When the output tiptoe positions of the user are present in the recognition area A3, the entry determination unit 220 determines that the tiptoe T of the user enter the recognition area A3. On the other hand, when the tiptoe positions of the user are not output or when the output tiptoe positions of the user are present outside the recognition area A3, the entry determination unit 220 determines that the tiptoe T of the user does not enter the recognition area A3. In the following description, an image input into the trained model when entry determination for the tiptoe T of the user in the recognition area A3 is affirmative is referred to as a "first reference image". In other words, it can be said that the first reference image is an image obtained by imaging the tiptoe T of the user when the entry determination processing is completed.

Figure 3:
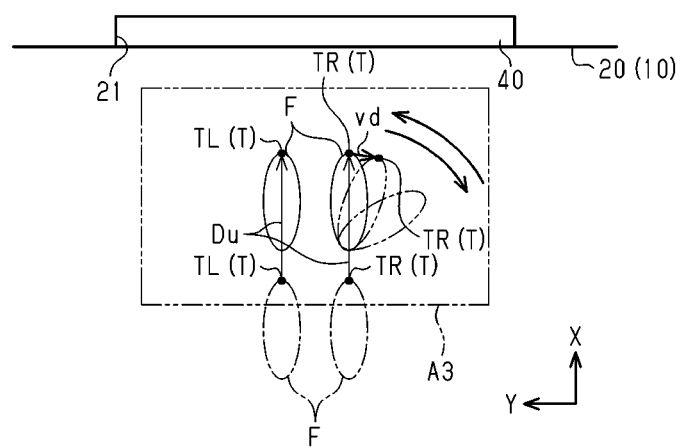
FIG. 3 is a schematic diagram showing a state in which a user who enters a recognition area makes a gesture.
Figure 4:
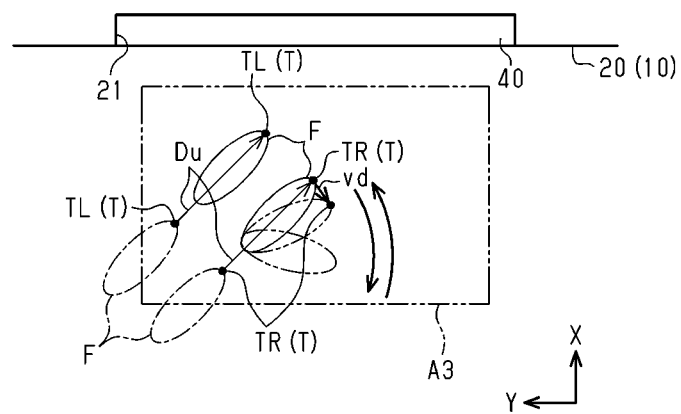
FIG. 4 is a schematic diagram showing a state in which the user who enters the recognition area makes a gesture.

FIGS. 3 and 4 each show a state in which the tiptoe T of the user indicated by dot-dash lines enters the recognition area A3. By performing the entry determination processing, the entry determination unit 220 can detect that the tiptoe T of the user enters the recognition area A3 regardless of a direction in which the user approaches the vehicle 10.

When the side mirror 50 is unfolded or folded, a direction of the camera 80 changes. Therefore, the operation detection device 200 preferably adjusts a position of the recognition area A3 depending on whether the side mirror 50 is unfolded or folded. Alternatively, the operation detection device 200 may adjust the direction and a position of the camera 80 such that the camera 80 faces the same direction regardless of whether the side mirror 50 is unfolded or folded.

In addition, although common to the following description, a position output by the trained model is not necessarily a tiptoe position of the user depending on a performance of the trained model. In other words, the trained model may output a position of a moving body that is not the tiptoe T of the user. However, in the present description, it is assumed that the trained model can output the tiptoe positions of the user when the tiptoe positions of the user are present in the imaging area A2 in order to facilitate understanding of the description.

<Direction Specification Processing>

In the direction specification processing, the entry determination unit 220 specifies a direction Du of the user in the recognition area A3. Specifically, the entry determination unit 220 sets, as the direction Du of the user, a direction from the tiptoe position of the user in the first reference image to the tiptoe position of the user in an image captured after the first reference image. The entry determination unit 220 matches feature data of an area including the tiptoe position of the user in the first reference image with respect to the image captured after the first reference image, thereby specifying the tiptoe position of the user in the image captured after the first reference image. Since two tiptoe positions of a right-foot tiptoe TR and a left-foot tiptoe TL are present in the first reference image, feature data of both areas including an area containing the tiptoe position of the right foot and an area containing the tiptoe position of the left foot are matched. For the matching of the feature data between such two images, OpenCV, which is an open-source computer vision library, can be used.

In FIGS. 3 and 4, the foot F of the user who advances into the recognition area A3 is indicated by solid lines, and the direction Du of the user is indicated by solid straight-line arrows. In other words, a movement direction of the tiptoe T of the user who advances into the recognition area A3 is indicated by solid straight-line arrows. By performing the direction specification processing, the entry determination unit 220 can specify the direction Du of the user regardless of the direction in which the user approaches the vehicle 10. Specifically, as shown in FIG. 3, the direction Du of the user when the user approaches the vehicle 10 is a direction along the width direction. On the other hand, as shown in FIG. 4, the direction Du of the user when the user approaches the vehicle 10 is a direction intersecting both the width direction and the front-rear direction. When a movement direction of the right-foot tiptoe TR and a movement direction of the left-foot tiptoe TL are different from each other, a direction obtained by adding both movement directions may be set as the direction Du of the user.

The entry determination unit 220 may calculate the direction Du of the user based on the first reference image and one image captured after the first reference image, or may calculate the direction Du of the user based on the first reference image and a plurality of images captured after the first reference image. In the following description, the last captured image among images used to calculate the direction Du of the user is referred to as a "second reference image". In other words, it can be said that the second reference image is an image obtained by imaging the tiptoe T of the user when the direction specification processing is completed.

Next, the gesture determination unit 230 will be described.

The gesture determination unit 230 performs gesture setting processing, displacement vector calculation processing, gesture determination processing, and stop determination processing. These processing is performed after it is determined that the tiptoe T of the user enters the recognition area A3.

<Gesture Setting Processing>

In the gesture setting processing, the gesture determination unit 230 sets a gesture pattern associated with the direction Du of the user. Hereinafter, a relationship between the direction Du of the user and the gesture pattern will be described.

As indicated by solid curve arrows in FIGS. 3 and 4, a gesture for opening the sliding door 40 is a motion of waving the right-foot tiptoe TR such that the right-foot tiptoe TR draws an arc. In other words, the gesture is a motion of moving the right-foot tiptoe TR away from and toward the left foot without changing the position of a right-foot heel.

Figure 5:
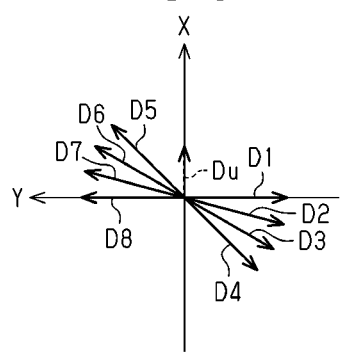
FIG. 5 is a diagram showing a gesture pattern corresponding to a direction of the user in FIG. 3.

In a case where the direction Du of the user is a direction shown in FIG. 3, the gesture determination unit 230 determines that the user makes a gesture when the movement direction of the right-foot tiptoe TR of the user is switched in an order of directions D1 to D8 shown in FIG. 5. On the other hand, in a case where the direction Du of the user is a direction shown in FIG. 4, the gesture determination unit 230 determines that the user makes a gesture when the movement direction of the right-foot tiptoe TR of the user is switched in an order of directions D1 to D8 shown in FIG. 6.

Figure 6:
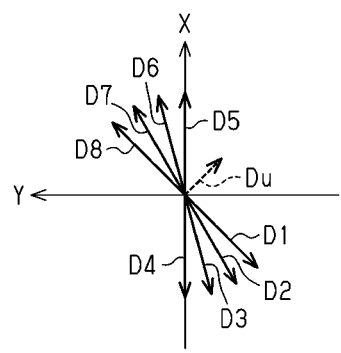
FIG. 6 is a diagram showing a gesture pattern corresponding to a direction of the user in FIG. 4.

As shown in FIGS. 3 and 4, when the directions Du of the user are different from each other, the directions D1 to D8 shown in FIG. 5 and the directions D1 to D8 shown in FIG. 6 are different from each other in a relationship with the vehicle 10, in other words, in a relationship with the X axis and the Y axis. As an example, the direction D1 in FIG. 5 is a direction extending in the front-rear direction, while the direction D1 in FIG. 6 is a direction intersecting both the width direction and the front-rear direction. On the other hand, when the direction Du of the user is used as a reference, the directions D1 to D8 shown in FIG. 5 and the directions D1 to D8 shown in FIG. 6 are the same direction respectively. For example, both the direction D1 in FIG. 5 and the direction D1 in FIG. 6 are directions inclined by 90 degrees in a clockwise direction with respect to the direction Du of the user.

In this manner, the gesture determination unit 230 sets gesture patterns as shown in FIGS. 5 and 6 in association with the direction Du of the user as shown in FIGS. 3 and 4. The gesture patterns shown in FIGS. 5 and 6 are examples. Therefore, a gesture pattern in practice may be more detailed or simpler than the gesture patterns shown in FIGS. 5 and 6.

<Displacement Vector Calculation Processing>

In the displacement vector calculation processing, the gesture determination unit 230 calculates a displacement vector vd of the tiptoe T of the user based on a plurality of images captured at a time interval. A direction of the displacement vector vd indicates the movement direction of the tiptoe T of the user, and magnitude of the displacement vector vd indicates a movement amount of the tiptoe T of the user. The displacement vector calculation processing is performed after the direction Du of the user is specified by the entry determination unit 220.

The gesture determination unit 230 calculates the displacement vectors vd from the tiptoe position of the user in the second reference image toward a tiptoe position of the user in an image (hereinafter, also referred to as an "N-th image") captured after the second reference image. The gesture determination unit 230 specifies the tiptoe position of the user in the N-th image by matching feature data of an area including the tiptoe position of the user in the second reference image with respect to the N-th image. Then, the gesture determination unit 230 calculates the displacement vector vd based on the tiptoe positions of the user in both the images. Here, the second reference image corresponds to a "specified image" in which the tiptoe position is specified, and the N-th image corresponds to an "unspecified image" in which the tiptoe position is not specified.

In the second reference image, since two tiptoe positions of the right-foot tiptoe TR and the left-foot tiptoe TL are present, the feature data for both areas including the area containing the tiptoe position of the right foot and the area containing the tiptoe position of the left foot are matched. That is, the gesture determination unit 230 calculates the displacement vector vd of the right-foot tiptoe TR of the user and the displacement vector vd of the left-foot tiptoe TL of the user. Here, when the user makes a gesture, the right-foot tiptoe TR of the user moves while the left-foot tiptoe TL of the user does not move. Thus, among the two displacement vectors vd calculated by the gesture determination unit 230, the displacement vector vd having larger magnitude corresponds to the right-foot tiptoe TR of the user, and the displacement vector vd having smaller magnitude corresponds to the left-foot tiptoe TL of the user. Therefore, the gesture determination unit 230 then may not need to calculate the displacement vector vd of the tiptoe T assumed to be the left-foot tiptoe TL.

When calculation of the displacement vector vd of the tiptoe position of the user between the second reference image and the N-th image is completed, the gesture determination unit 230 calculates the displacement vector vd from the tiptoe position of the user in the N-th image toward a tiptoe position of the user in an image (hereinafter, also referred to as an "(N+1)-th image") captured after the N-th image. The gesture determination unit 230 specifies the tiptoe position of the user in the (N+1)-th image by matching feature data of an area including the tiptoe position of the user in the N-th image with respect to the (N+1)-th image. In this case, the N-th image corresponds to the "specified image", and the (N+1)-th image corresponds to the "unspecified image". In this manner, every time a next image is acquired from the camera 80, the gesture determination unit 230 repeatedly calculates the displacement vector vd of the tiptoe T of the user between two images captured in a predetermined cycle. That is, the "specified image" and the "unspecified image" are sequentially switched.

The gesture determination unit 230 may calculate the displacement vector vd by using an image of each frame output from the camera 80, or may calculate the displacement vector vd by using an image of every two frame output from the camera 80. That is, the gesture determination unit 230 does not need to calculate the displacement vector vd using the entire image captured by the camera 80. In addition, it can be said that the magnitude of the displacement vector vd represents the movement amount of the tiptoe T of the user per unit time, in other words, a displacement velocity of the tiptoe T of the user, at a point that the displacement vector vd with respect to a certain elapsed time is calculated.

<Gesture Determination Processing>

In the gesture determination processing, when the direction of the displacement vector vd of the tiptoe T of the user changes in accordance with the set gesture pattern, the gesture determination unit 230 determines that a gesture is made. That is, the gesture determination unit 230 outputs various command signals to the door control device 100.

The gesture determination unit 230 may simultaneously or sequentially perform the displacement vector calculation processing and the gesture determination processing. In the former case, every time one displacement vector vd is calculated, the gesture determination unit 230 determines whether the direction of the displacement vector vd is a direction corresponding to the gesture pattern. In the latter case, the gesture determination unit 230 determines whether directions of a plurality of displacement vectors vd change in the direction corresponding to the gesture pattern after a large number of displacement vectors vd are calculated.

<Stop Determination Processing>

The gesture determination unit 230 continues or stops determination for the gesture in the stop determination processing. The stop determination processing is performed in parallel with the gesture determination processing.

For example, in a case where the user does not make a gesture, such as a case where the user stops in the recognition area A3, the movement amount of the tiptoe T of the user per unit time is easily set to "0" or a value close to "0". Therefore, when the magnitude of the displacement vector vd of the tiptoe T is less than a predetermined lower limit determination value vdth1, the gesture determination unit 230 stops the determination for the gesture.

However, depending on a state when the user makes a gesture, the displacement velocity of the tiptoe T of the user temporarily decreases, whereby the movement amount of the tiptoe T per unit time may temporarily become "0" or a value close to "0". When the direction of the displacement vector vd of the tiptoe T is reversed, the movement amount of the tiptoe T per unit time may temporarily become "0" or a value close to "0". Therefore, when the number of times in which the magnitude of the displacement vector vd of the tiptoe T is less than the lower limit determination value vdth1 is less than a predetermined number of times cntth of stop determination, the gesture determination unit 230 does not stop the determination for the gesture. In other words, when the number of times in which the magnitude of the displacement vector vd of the tiptoe T is less than the lower limit determination value vdth1 is equal to or greater than the number of times cntth of stop determination, the gesture determination unit 230 stops the determination for the gesture.

When the user makes a gesture, there is a limit in the displacement velocity of the tiptoe T. In other words, when the movement amount of the tiptoe T per unit time is excessively large, it is highly possible that a calculation target of the displacement vector vd is not the tiptoe T of the user. Therefore, when the magnitude of the displacement vector vd of the tiptoe T is equal to or greater than an upper limit determination value vdth2, the gesture determination unit 230 stops the determination for the gesture.

The lower limit determination value vdth1, the upper limit determination value vdth2, and the number of times cntth of stop determination are preferably set in advance based on simulations, experiments, and the like. For example, it is considered that an average value $\mu$ and a standard deviation $\sigma$ of the displacement velocity are calculated based on a measurement result of the displacement velocity of the tiptoe T when a plurality of users make a gesture under a plurality of conditions. In this case, the lower limit determination value vdth1 may be set to a value corresponding to "$\mu-3\sigma$", or the upper limit determination value vdth2 may be set to a value corresponding to "$\mu+3\sigma$".

Hereinafter, a flow of processing performed by the operation detection device 200 to detect a gesture of the user, in other words, an operation detection method will be described with reference to flowcharts shown in FIGS. 7 to 9. Subsequent processing is performed in a predetermined control cycle while the vehicle 10 is parked.

Figure 7:
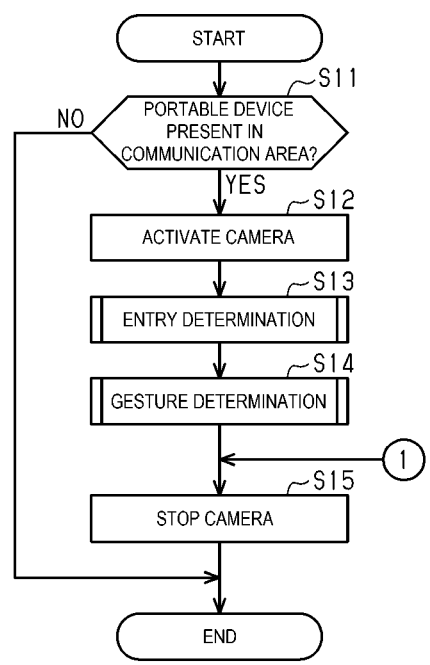
FIG. 7 is a flowchart showing a flow of processing performed by the operation detection device in order to detect a gesture of the user.

As shown in FIG. 7, the operation detection device 200 determines whether the portable device 300 is present in the communication area A1 based on the signal output from the wireless communication device 90 (S11). When the portable device 300 is not present in the communication area A1 (S11: NO), in other words, when the user is not present in the communication area A1, the operation detection device 200 ends the present processing.

On the other hand, when the portable device 300 is present in the communication area A1 (S11: YES), in other words, when the user is present in the communication area A1, the operation detection device 200 activates the camera 80 (S12). In step S12, when it is possible to determine the position where the portable device 300 is present, i.e., the communication area A1 on a right side or a left side of the vehicle 10, the camera 80 corresponding to the communication area A1 in which the portable device 300 is present is activated. For example, when the portable device 300 is present in the communication area A1 on the right side of the vehicle 10, the camera 80 provided on the side mirror 50 on the right side is activated.

Subsequently, the operation detection device 200 performs processing for determining entry of the user into the recognition area A3 and processing for detecting the gesture of the user (S13 and S14). Thereafter, the operation detection device 200 stops the camera 80 (S15), and ends the present processing.

Next, processing contents of determining the entry of the user into the recognition area A3 will be described with reference to the flowchart shown in FIG. 8.

Figure 8:
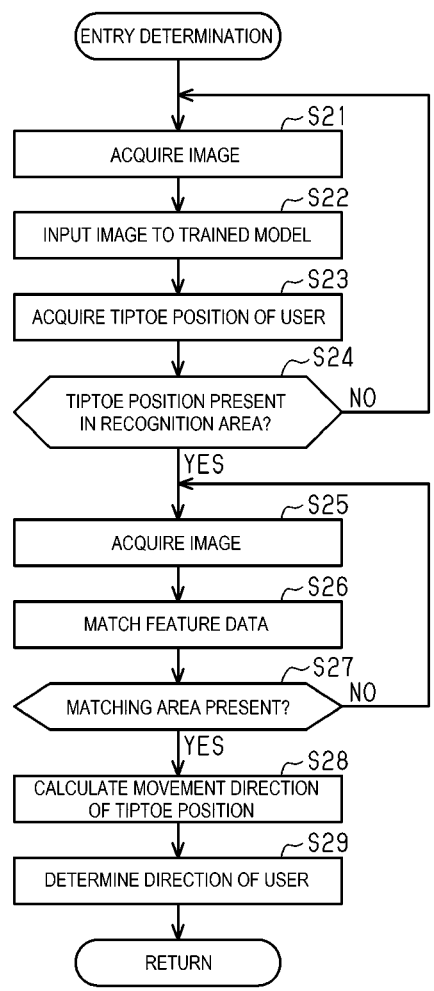
FIG. 8 is a flowchart showing a flow of processing performed by the operation detection device in order to determine whether the user enters the recognition area.

As shown in FIG. 8, the operation detection device 200 acquires an image captured by the camera 80 (S21). Subsequently, the operation detection device 200 inputs the acquired image into the trained model to acquire the tiptoe position of the user in the image (S22 and S23). Subsequently, the operation detection device 200 determines whether the tiptoe position of the user is present in the recognition area A3 (S24). When the tiptoe position of the user is not present in the recognition area A3 (S24: NO), the operation detection device 200 shifts the processing to step S21. In this case, the operation detection device 200 performs processing of steps S22 and S23 on a next image. In this manner, the operation detection device 200 waits for the tiptoe T of the user to enter the recognition area A3.

On the other hand, when the tiptoe position of the user is present in the recognition area A3 (S24: YES), the operation detection device 200 acquires the next image (S25). Here, when affirmative determination is made in processing of step S24, the image to be determined corresponds to the first reference image.

Subsequently, the operation detection device 200 matches feature data between the first reference image and the image acquired in step S25 (S26). Subsequently, the operation detection device 200 determines whether an area that matches the feature data of the area including the tiptoe position of the user in the first reference image is included in the image acquired in step S25 (S27).

When the matching area is not included in the image acquired in step S25 (S27: NO), the operation detection device 200 shifts the processing to step S25. On the other hand, when the matching area is included in the image acquired in step S25 (S27: YES), the operation detection device 200 calculates the movement direction of the tiptoe T of the user between the two images (S28). In step S27, the image that is not the first reference image among the images used to calculate the movement direction of the tiptoe T of the user corresponds to the second reference image. Thereafter, the operation detection device 200 determines the calculated movement direction of the tiptoe T of the user as the direction Du of the user in the recognition area A3 (S29).

Next, processing contents of determining whether the user makes a gesture will be described with reference to the flowchart shown in FIG. 9.

Figure 9:
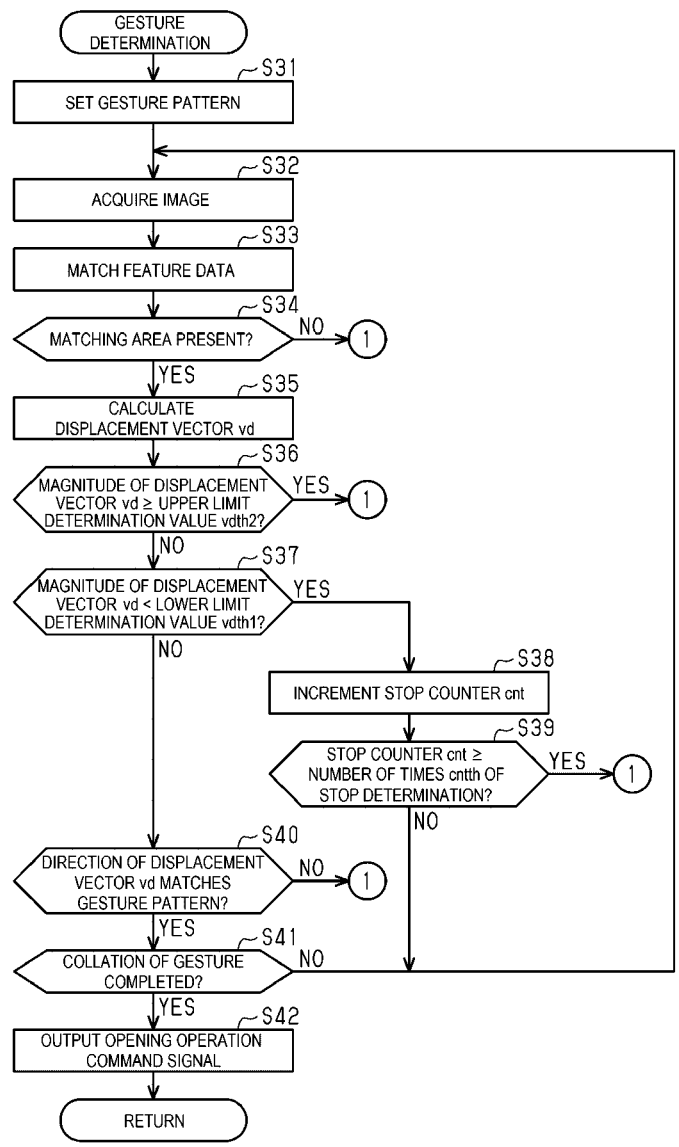
FIG. 9 is a flowchart showing a flow of processing performed by the operation detection device to determine whether the user makes a gesture.

As shown in FIG. 9, the operation detection device 200 sets the gesture pattern according to the direction Du of the user (S31). For example, when the direction Du of the user is the direction shown in FIG. 3, the gesture pattern shown in FIG. 5 is set, and when the direction Du of the user is the direction shown in FIG. 4, the gesture pattern shown in FIG. 6 is set.

Subsequently, the operation detection device 200 acquires a next image (S32). Then, the operation detection device 200 matches feature data between the previously acquired image and the currently acquired image in step S32 (S33). When step S33 is performed for the first time, the previously acquired image is the second reference image.

Subsequently, the operation detection device 200 determines whether an area that matches the feature data of the area including the tiptoe position of the user in the previously acquired image is included in the currently acquired image (S34). When the matching area is not included in the recognition area A3 in the currently acquired image (S34: NO), the operation detection device 200 shifts the processing to step S15.

On the other hand, when the matching area is included in the recognition area A3 in the currently acquired image (S34: YES), the operation detection device 200 calculates the displacement vector vd of the tiptoe T of the user (S35). Subsequently, the operation detection device 200 determines whether the magnitude of the displacement vector vd is equal to or greater than the upper limit determination value vdth2 (S36). When the magnitude of the displacement vector vd is equal to or greater than the upper limit determination value vdth2 (S36: YES), in other words, when it is highly possible that the moving body displaced between the two images is not appropriate as a gesture detection target, the operation detection device 200 shifts the processing to step S15.

On the other hand, when the magnitude of the displacement vector vd is less than the upper limit determination value vdth2 (S36: NO), the operation detection device 200 determines whether the magnitude of the displacement vector vd is less than the lower limit determination value vdth1 (S37). When the magnitude of the displacement vector vd is less than the lower limit determination value vdth1 (S37: YES), in other words, when it is highly possible that the moving body displaced between the two images is not appropriate as the gesture detection target, the operation detection device 200 increments a stop counter cnt (S38). The stop counter cnt is a variable for counting the number of times the magnitude of the displacement vector vd is less than the lower limit determination value vdth1. The stop counter cnt is initialized to "0" at the start of the present processing.

Subsequently, the operation detection device 200 determines whether the stop counter cnt is equal to or greater than the number of times cntth of stop determination (S39). When the stop counter cnt is equal to or greater than the number of times cntth of stop determination (S39: YES), for example, when the user remains in the recognition area A3 for a long period of time without making a gesture, the operation detection device 200 shifts the processing to step S15. On the other hand, when the stop counter cnt is less than the number of times cntth of stop determination (S39: NO), for example, when the user stops making the gesture for a fairly short period of time, the operation detection device 200 shifts the processing to step S32. In this case, the operation detection device 200 determines that the user continues the gesture.

In step S37, when the magnitude of the displacement vector vd is equal to or greater than the lower limit determination value vdth1 (S37: NO), the operation detection device 200 determines whether the direction of the displacement vector vd matches the gesture pattern (S40). When the direction of the displacement vector vd does not match the gesture pattern (S40: NO), the operation detection device 200 shifts the processing to step S15. On the other hand, when the direction of the displacement vector vd matches the gesture pattern (S40: YES), the operation detection device 200 determines whether collation of the gesture is completed (S41). When the collation of the gesture is not completed (S41: NO), the operation detection device 200 shifts the processing to step S32. On the other hand, when the collation of the gesture is completed (S41: YES), the operation detection device 200 outputs an opening operation command signal to the door control device 100 (S42).

Even after the portable device 300 enters the communication area A1 (S11: YES), the operation detection device 200 preferably ends a series of processing in the following cases. For example, the operation detection device 200 preferably ends the present processing when the portable device 300 moves out of the communication area A1, when the sliding door 40 starts to open, when an ACC power supply and an IG power supply are turned on, when a predetermined timeout condition is satisfied, or the like.

Functions of the present embodiment will be described.

For example, it is assumed that a user holding a baggage in both hands tries to ride in the vehicle 10. In this case, after moving to a front of the sliding door 40 of the vehicle 10, the user waves the tiptoe T of the right foot with the left foot as a pivot foot. Then, the sliding door 40 is opened, and the user can place the baggage held by both hands on a rear seat. Here, a direction in which the user approaches the vehicle 10 may be the front-rear direction of the vehicle 10, the width direction of the vehicle 10, or the direction intersecting both the front-rear direction and the width direction of the vehicle 10. That is, the user can open the sliding door 40 by making a certain gesture regardless of the direction in which the user approaches the vehicle 10.

Effects of the present embodiment will be described.

(1) When the tiptoe T of the user enters the recognition area A3, the operation detection device 200 determines whether a gesture using the tiptoe T of the user is made. Here, the operation detection device 200 determines whether the tiptoe T of the user enters the recognition area A3 using an image captured by the camera 80 and a trained model. Therefore, it is possible to accurately determine that the tiptoe T of the user enters the recognition area A3. In this manner, in the operation detection device 200, detection accuracy for a gesture of the user can be improved.

(2) In the displacement vector calculation processing, the operation detection device 200 calculates the displacement vector vd of the tiptoe position between a plurality of images by matching feature data of an area including the tiptoe position. Therefore, in the operation detection device 200, a calculation load when calculating the displacement vector vd can be reduced.

(3) When the magnitude of the displacement vector vd of the tiptoe T of the user is less than the lower limit determination value vdth1, the operation detection device 200 stops determination for the gesture. Therefore, in the operation detection device 200, a possibility of erroneously determining a gesture of the user can be reduced.

(4) When the number of times in which the magnitude of the displacement vector vd of the tiptoe T of the user is less than the lower limit determination value vdth1 is less than the number of times cntth of stop determination, the operation detection device 200 does not stop the determination for the gesture. That is, the operation detection device 200 is less likely to stop the determination for the gesture due to a state of the user, contents of gesture, and the like. Therefore, in the operation detection device 200, a decrease in determination accuracy of a gesture can be prevented.

(5) When the magnitude of the displacement vector vd of the tiptoe T of the user is equal to or greater than the upper limit determination value vdth2, the operation detection device 200 stops the determination for the gesture. Therefore, in the operation detection device 200, the possibility of erroneously determining a gesture can be reduced.

(6) The operation detection device 200 determines that the tiptoe T of the displacement vector vd having larger magnitude among two displacement vectors vd of the tiptoe positions of both feet of the user is the tiptoe T that makes the gesture. Therefore, the operation detection device 200 can determine that the user makes the gesture even when the user makes the gesture with the left-foot tiptoe TL instead of the right-foot tiptoe TR.

The present embodiment can be modified and implemented as follows. The present embodiment and the following modification can be implemented in combination with each other within a range that the embodiment and the modification do not technically contradict each other.

In the displacement vector calculation processing, the gesture determination unit 230 may calculate the displacement vector vd based on the tiptoe position of the user for each of a plurality of images obtained by inputting a plurality of images captured at a time interval into a trained model. Specifically, the gesture determination unit 230 may calculate the displacement vector vd based on the tiptoe position of the user obtained by inputting a previously acquired image into the trained model and the tiptoe position of the user obtained by inputting a subsequently acquired image into the trained model. Hereinafter, a brief description will be given with reference to a flowchart shown in FIG. 10. The flowchart shown in FIG. 10 shows parts different from the flowchart shown in FIG. 9.

Figure 10:
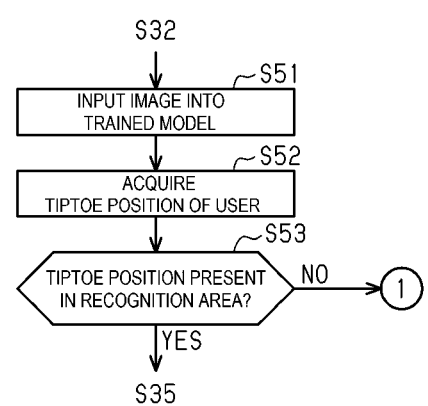
FIG. 10 is a flowchart showing a flow of processing performed by an operation detection device according to a modification.

As shown in FIG. 10, the operation detection device 200 acquires an image (S32). Subsequently, the operation detection device 200 acquires the tiptoe position of the user by inputting the acquired image into the trained model (S51 and S52). Thereafter, the operation detection device 200 determines whether the tiptoe position of the user is present in the recognition area A3 (S53). When the tiptoe position of the user is not present in the recognition area A3 (S53: NO), the operation detection device 200 shifts the processing to step S15. On the other hand, when the tiptoe position of the user is present in the recognition area A3 (S53: YES), the operation detection device 200 calculates the displacement vector vd based on the tiptoe position in the previously acquired image and the tiptoe position in the subsequently acquired image (S35).

In this manner, the gesture determination unit 230 can specify the tiptoe position of the user in the image by inputting the newly acquired image into the trained model. Accordingly, the operation detection device 200 can accurately calculate the displacement vector vd of the tiptoe T of the user. When the entry determination unit 220 performs the direction specification processing (S26 and S27), the same processing can be performed as well.

The operation detection device 200 may use the above embodiment and the above modification in combination with each other in order to acquire the tiptoe position of the user.

The trained model may be a model that receives the image captured by the camera 80 as input and outputs a position of the right-foot tiptoe TR of the user. In this case, training data is image data in which only the position of the right-foot tiptoe TR of the user is designated. The trained model may include a model that outputs the position of the right-foot tiptoe TR of the user and a model that outputs a position of the left-foot tiptoe TL of the user.

The gesture of the user may be a gesture using a body part other than the foot F. For example, when the body part is a head portion, the gesture of the user may be a motion of snaking the head portion up and down or left and right. When the body part is a hand or an arm portion, the gesture of the user may be a motion of waving the hand or the arm portion up and down or left and right. In addition, when the body part is an eyelid, the gesture of the user may be a motion of blinking one eye.

The operation detection device 200 may advance machine learning in accordance with use of the vehicle 10 by the user. Accordingly, the trained model can be a model adapted to an actual use environment of the vehicle 10 of the user.

The operation detection device 200 may detect a gesture of the user for closing the sliding door 40. In this case, a gesture for opening the sliding door 40 and the gesture for closing the sliding door 40 may be the same as or different from each other.

When receiving an opening operation command signal from the operation detection device 200, the door control device 100 may only cause the lock mechanism 60 to perform an unlatching operation.

The camera 80 may not be installed on the side mirror 50. For example, the camera 80 may be installed at an upper end of the door opening portion 22, or may be installed on the sliding door 40.

An "opening and closing body" may be the front door 30, a back door, or a movable panel of a sunroof device.

The door control device 100 and the operation detection device 200 may be configured as one or more processors that operate in accordance with a computer program (software). In addition, the door control device 100 and the operation detection device 200 may be configured as one or more dedicated hardware circuits such as dedicated hardware (application specific integrated circuit (ASIC)) that executes at least a part of various processing. Further, the door control device 100 and the operation detection device 200 may be configured as a circuit including a combination of these two devices. The processor includes a CPU and a memory such as RAM and ROM. The memory stores a program code or a command configured to cause the CPU to execute processing. The memory, that is, a storage medium includes any available medium that can be accessed by a general-purpose or dedicated computer.

According to an aspect of this disclosure, a vehicle operation detection device, which is to be applied to a vehicle including a vehicle body having an opening portion, an opening and closing body configured to open and close the opening portion, a driving unit configured to cause an opening or closing operation of the opening and closing body, and a camera configured to capture an image of a periphery of the opening portion, and which detects a gesture of a user as a trigger to start the opening or closing operation of the opening and closing body, includes: a storage unit configured to store a trained model obtained by machine learning using training data in which the image captured in advance and a body part used for the gesture of the user are associated with each other; an entry determination unit configured to determine, based on a position of the body part in the image obtained by inputting a newly captured image into the trained model, whether the body part enters a recognition area set in an imaging area of the camera; and a gesture determination unit configured to calculate a displacement vector of the body part based on a plurality of images captured at a time interval after it is determined that the body part enters the recognition area, and determine, in accordance with whether a direction of the displacement vector is a direction corresponding to the gesture, whether the gesture is made.

When a body part of the user enters the recognition area, the vehicle operation detection device having the above configuration determines whether a gesture using the body part is made. Here, the vehicle operation detection device determines whether the body part of the user enters the recognition area using the image captured by the camera and the trained model. Therefore, it is possible to accurately determine that the body part of the user enters the recognition area. In this manner, in the vehicle operation detection device, detection accuracy for a gesture of the user can be improved.

In the vehicle operation detection device described above, when, among the plurality of images captured at a time interval, an image in which the position of the body part is specifiable is set as a specified image, and an image in which the position of the body part is not specifiable is set as an unspecified image, the gesture determination unit may specify the position of the body part in the unspecified image by matching feature data of an area including the position of the body part in the specified image with respect to the unspecified image, and may calculate the displacement vector based on the position of the body part in the specified image and the position of the body part in the unspecified image.

In the vehicle operation detection device, a calculation load when calculating the displacement vector can be reduced.

In the vehicle operation detection device described above, the gesture determination unit may calculate the displacement vector based on the position of the body part for each of the plurality of images obtained by inputting the plurality of images captured at a time interval into the trained model.

The vehicle operation detection device can accurately calculate the displacement vector of the body part.

In the vehicle operation detection device described above, the gesture determination unit may stop the determination for the gesture when magnitude of the displacement vector is less than a lower limit determination value.

For example, in a case where the user does not make a gesture, such as a case where the user stops in the recognition area, a movement amount of the body part of the user per unit time is easily set to "0" or a value close to "0". In this regard, when the magnitude of the displacement vector of the body part is less than the lower limit determination value, the vehicle operation detection device having the above configuration stops the determination for the gesture. Therefore, in the vehicle operation detection device, a possibility of erroneously determining the gesture of the user can be reduced.

In the vehicle operation detection device described above, the gesture determination unit may not stop the determination for the gesture when the number of times in which the magnitude of the displacement vector is less than the lower limit determination value is less than the number of times of stop determination even when the magnitude of the displacement vector is less than the lower limit determination value.

Depending on a state when the user makes a gesture, a displacement velocity of the body part of the user temporarily decreases, whereby the movement amount of the body part per unit time may temporarily become "0" or a value close to "0". When the user makes a gesture such that the direction of the displacement vector of the body part is reversed, the movement amount of the body part per unit time may temporarily become "0" or a value close to "0". In this regard, when the number of times in which the magnitude of the displacement vector of the body part is less than the lower limit determination value is less than the number of times of stop determination, the vehicle operation detection device having the above configuration does not stop the determination for the gesture. That is, the vehicle operation detection device is less likely to stop the determination for the gesture due to a state of the user, contents of the gesture, and the like. Therefore, in the vehicle operation detection device, a decrease in determination accuracy for the gesture can be prevented.

In the vehicle operation detection device described above, the gesture determination unit may stop the determination for the gesture when the magnitude of the displacement vector is equal to or greater than an upper limit determination value.

When the user makes a gesture, there is a limit in the displacement velocity of the body part. In other words, when the movement amount of the body part per unit time is excessively large, it is highly possible that a calculation target of the displacement vector is not the body part of the user. In this regard, when the magnitude of the displacement vector of the body part is equal to or greater than the upper limit determination value, the vehicle operation detection device having the above configuration stops the determination for the gesture. Therefore, in the vehicle operation detection device, the possibility of erroneously determining a gesture can be reduced.

According to another aspect of this disclosure, a vehicle operation detection method for solving the above problem, which is to be applied to a vehicle including a vehicle body having an opening portion, an opening and closing body configured to open and close the opening portion, a driving unit configured to cause an opening or closing operation of the opening and closing body, and a camera configured to capture an image of a periphery of the opening portion, and which is for detecting a gesture of a user as a trigger to start the opening or closing operation of the opening and closing body, includes: a step of acquiring a position of a body part in the image by inputting a newly captured image into a trained model obtained by machine learning using training data in which the image captured in advance and the body part used for the gesture of the user are associated with each other; a step of determining, based on the acquired position of the body part, whether the body part enters a recognition area set in an imaging area of the camera; a step of calculating a displacement vector of the body part based on a plurality of images captured at a time interval after it is determined that the body part enters the recognition area; and a step of determining, in accordance with whether a direction of the displacement vector is a direction corresponding to the gesture, whether the gesture is made.

In the vehicle operation detection method having the above configuration, functions and effects same as those of the vehicle operation detection device described above can be obtained.

In the vehicle operation detection device described above, detection accuracy for a gesture of a user can be improved.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A vehicle operation detection device, which is to be applied to a vehicle including a vehicle body having an opening portion, an opening and closing body configured to open and close the opening portion, a driving unit configured to cause an opening or closing operation of the opening and closing body, and a camera configured to capture an image of a periphery of the opening portion, and which detects a gesture of a user as a trigger to start the opening or closing operation of the opening and closing body, the vehicle operation detection device comprising:
    a storage unit configured to store a trained model obtained by machine learning using training data in which the image captured in advance and a body part used for the gesture of the user are associated with each other;
    an entry determination unit configured to determine whether, based on a position of the body part in the image obtained by inputting a newly captured image into the trained model, the body part enters a recognition area set in an imaging area of the camera; and
    a gesture determination unit configured to calculate a displacement vector of the body part based on a plurality of images captured at a time interval after it is determined that the body part enters the recognition area, and determine, in accordance with whether a direction of the displacement vector is a direction corresponding to the gesture, whether the gesture is made.

2. The vehicle operation detection device according to claim 1, wherein
    when, among the plurality of images captured at a time interval, an image in which the position of the body part is specifiable is set as a specified image, and an image in which the position of the body part is not specifiable is set as an unspecified image,
    the gesture determination unit specifies the position of the body part in the unspecified image by matching feature data of an area including the position of the body part in the specified image with respect to the unspecified image, and calculates the displacement vector based on the position of the body part in the specified image and the position of the body part in the unspecified image.

3. The vehicle operation detection device according to claim 1, wherein
    the gesture determination unit calculates the displacement vector based on the position of the body part for each of the plurality of images obtained by inputting the plurality of images captured at a time interval into the trained model.

4. The vehicle operation detection device according to claim 1, wherein
    the gesture determination unit stops the determination for the gesture when magnitude of the displacement vector is less than a lower limit determination value.

5. The vehicle operation detection device according to claim 4, wherein
    the gesture determination unit does not stop the determination for the gesture when the number of times in which the magnitude of the displacement vector is less than the lower limit determination value is less than the number of times of stop determination even when the magnitude of the displacement vector is less than the lower limit determination value.

6. The vehicle operation detection device according to claim 1, wherein
    the gesture determination unit stops the determination for the gesture when the magnitude of the displacement vector is equal to or greater than an upper limit determination value.

7. A vehicle operation detection method, which is to be applied to a vehicle including a vehicle body having an opening portion, an opening and closing body configured to open and close the opening portion, a driving unit configured to cause an opening or closing operation of the opening and closing body, and a camera configured to capture an image of a periphery of the opening portion, and which is for detecting a gesture of a user as a trigger to start the opening or closing operation of the opening and closing body, the vehicle operation detection method comprising:
    a step of acquiring a position of a body part in the image by inputting a newly captured image into a trained model obtained by machine learning using training data in which the image captured in advance and the body part used for the gesture of the user are associated with each other;
    a step of determining, based on the acquired position of the body part, whether the body part enters a recognition area set in an imaging area of the camera;
    a step of calculating a displacement vector of the body part based on a plurality of images captured at a time interval after it is determined that the body part enters the recognition area; and
    a step of determining, in accordance with whether a direction of the displacement vector is a direction corresponding to the gesture, whether the gesture is made.

* * * * *